Sept. 11, 1934.    M. J. HANLON    1,973,624
AUTOMOBILE FASTENING DEVICE
Filed March 31, 1933    2 Sheets-Sheet 2
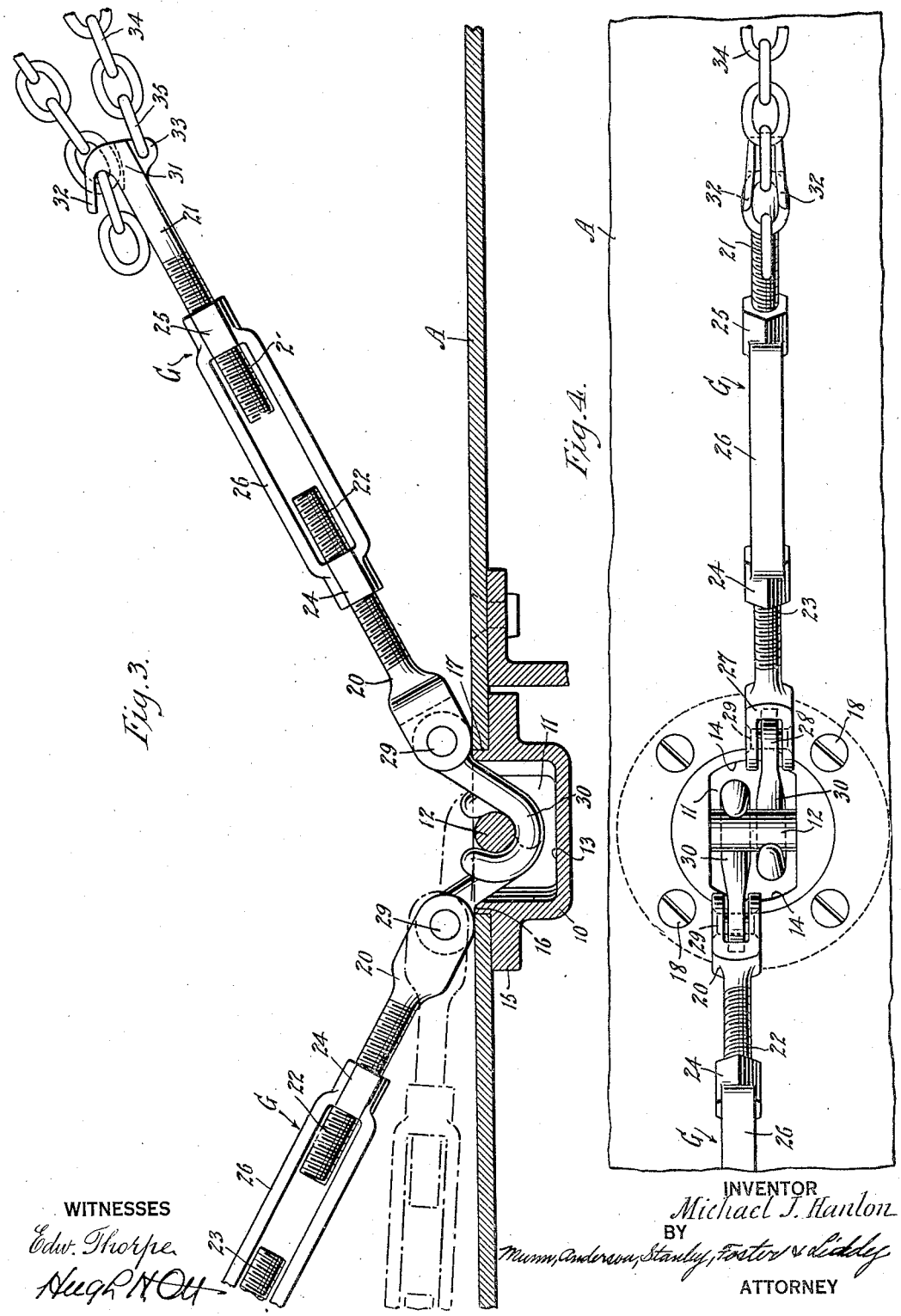
WITNESSES
Edw. Thorpe
Hugh H Ou
INVENTOR
Michael J. Hanlon
BY
Munn, Anderson, Stanly, Foster & Liddy
ATTORNEY Patented Sept. 11, 1934

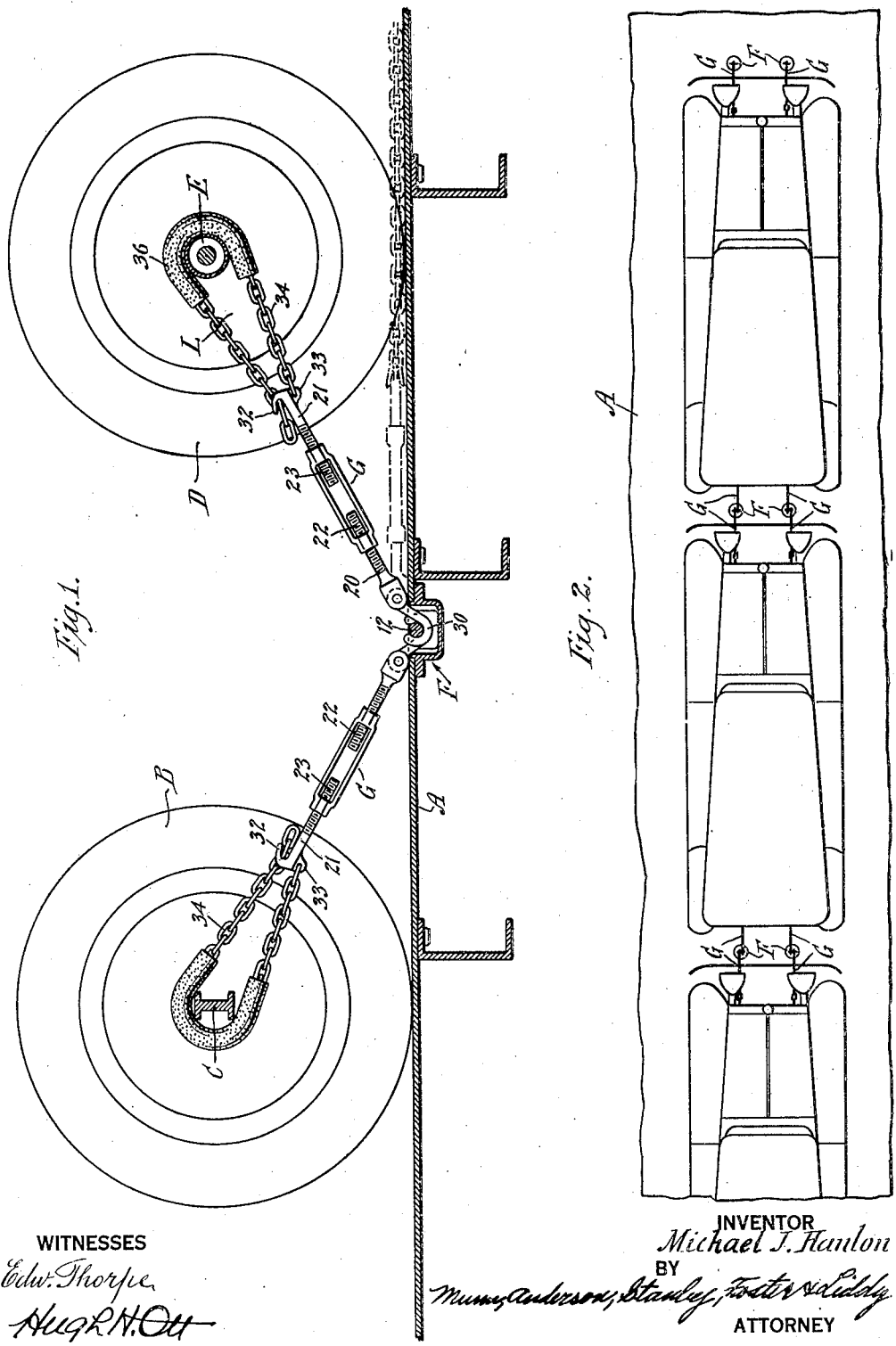

1,973,624

UNITED STATES PATENT OFFICE 1,973,624

AUTOMOBILE FASTENING DEVICE

Michael J. Hanlon, Weehawken, N. J., assignor to Black Diamond Steamship Corporation, New York, N. Y., a corporation of Delaware Application March 31, 1933, Serial No. 663,833

2 Claims. (Cl. 188—32)

This invention relates to an accessory which is particularly designed for cargo ships, and has more particular reference to an improved device for fastening cargo to the deck of a ship, and while not necessarily restricted to such use, the device is especially adapted for securing uncrated automobiles or other equivalent wheeled vehicles to the deck of a ship or transport.

Heretofore cargo of this type has been fastened down or secured to the deck by various temporary and makeshift means or methods, none of which has proven satisfactory, due to the expense involved in installing and removing the same and the losses which have been sustained by damage resulting from inefficiency and failure of such means to properly perform their intended purpose.

The present invention provides a device or accessory which has been scientifically designed for the intended purpose and which is so constructed and arranged that it will serve to so securely fasten the cargo to the deck of the transport that it is a practical impossibility for it to become unintentionally dislodged or displaced.

The invention further affords a device for the purpose specified which greatly facilitates and expedites the operations of fastening or securing the cargo in place and unfastening or releasing the same, while not in any manner interfering with the optional use of the deck space for free cargo.

The invention further resides in a device or accessory of the indicated character which embodies but few and simple parts capable of economical production, assembly and installation and which at the same time is highly efficient in its purpose.

With the above recited and other objects in view, the invention is set forth in more detail in the following specification and in the accompanying drawings, in which there is disclosed a preferred embodiment of the invention, while the claims mark out and define the actual scope thereof.

In the drawings:

Figure 1 is a side view of the device with a part thereof in section and illustrating the principal use of the invention for the securing of uncrated automobiles to the deck of a ship.

Figure 2 is a plan view on a reduced scale, diagrammatically illustrating the manner in which a plurality of uncrated automobiles are fastened to the deck of a vessel.

Figure 3 is a view similar to Figure 1, showing the invention on a larger scale.

Figure 4 is a plan view thereof.

Referring to the drawings, the device has been illustrated in its principal use for fastening uncrated automobiles to the deck of a ship, and the device will be so described, with the understanding that this is merely illustrative of one of the many uses for which the invention may be employed.

In the drawings, A designates the conventional deck structure of a ship or other transport, B and C designate the front wheel and axle of an automobile, and D and E the rear wheel and real axle of an adjacent automobile. The devices employed for fastening or securing the automobiles or other cargo to the deck A include anchoring elements designated generally by the reference character F and attaching elements which are broadly designated by the reference character G.

The former, namely, the anchoring elements F, consist of a substantially cup shaped body 10 which defines a hollow well or depression 11 having a cross bar 12 which is preferably of circular cross sectional configuration and which is appropriately spaced from the bottom surface 13 and the end surfaces 14 of the well 11. The body 10 is formed with an outwardly projecting continuous horizontal flange 15 which is spaced from the upper end 16 of the body 10 a distance equal to the thickness of the deck A, and the upper end portion 16 is located in an opening 17 formed in the deck which is made to snugly receive the upper end so that said upper end is disposed flush with the upper surface of the deck A and offers no obstruction which protrudes thereabove. The flange 15 underlies the deck A and extends outwardly around the opening and is suitably secured thereto in any desired manner, such as by screws or equivalent fastening devices 18. The attaching elements G each consist of an elongated body which is adjustable in length and which, as illustrated, consist of a pair of axially aligned shanks 20 and 21, which shanks are provided with oppositely pitched threads 22 and 23 extending from their inner ends outwardly to cooperate with the correspondingly threaded bosses 24 and 25 of a turnbuckle 26, by virtue of which the adjustment in the length of the body of the attaching element G may be accomplished by turning the turnbuckle in opposite directions. The shank 20 is formed at its outer end with a bifurcated head 27, between the furcations of which head the base 28 of a hook is pivoted on a pivot 29 which extends transversely through the furcations. The body 30 of the hook is of such a design and shape and the arc is of such an extent that it may be engaged with and disengaged from the cross bar 12 only upon turning the same from the broken line position to the full line position illustrated in Figure 3, or vice versa, when the curvature of the bill of the hook is disposed under the cross bar 12. In other words, it should be understood that in the proper use of the device, the curved portion of the hook when engaged with the cross bar 12 should underlie the cross bar rather than overlie the same to insure against an accidental or unintentional disengagement when the fastening device is in use.

The other shank 21 is formed at its outer end with a head 31 which is fashioned to provide a pair of transversely spaced and rearwardly directed claws 32 and a diametrically projecting apertured lug 33. The attaching element G is completed by a flexible element, preferably a chain 34, the terminal link 35 of one end being swingably carried by and attached to the apertured lug 33, leaving the other end free to be passed around a portion of the cargo, which in the instance shown is either the front or rear axle C or E of an automobile.

After the hook 30 is engaged with the cross bar 12 of the anchoring element F in the manner shown and previously described, the flexible element or chain 34 is passed around the portion of the cargo or the axle of an automobile and is formed into a closed loop L by disposing one link between the claws 32 and an adjacent link transversely under the claws, it being understood that this engagement is made with the least slack possible in the loop thus formed. The slack is then taken up in the loop portion of the element or chain 34 by turning the turnbuckle 26 in a direction to advance the shanks 20 and 21 relatively toward each other. It is, of course, obvious that a suitable implement used as a lever may be passed through the slotted body of the turnbuckle 26 to accomplish the turning thereof for removing the slack and for drawing the attaching device taut. As shown, the tubular protector sleeve 36 may be arranged on the flexible element or chain 34 at the bight of the loop L so as to prevent damage and marring to the finish of the axle or other part of the cargo with which the chain or element would otherwise contact. In the use of the device for fastening uncrated automobiles to the deck A, preferably four attaching devices G are used on each automobile, as clearly illustrated in Figure 2, two of said elements being used on the front axle and two on the rear axle. The anchoring elements F will be so arranged and distributed with reference to the deck area that automobiles may be secured to the deck in rows and in fairly close relation to each other so as to utilize with the greatest economy the deck space. For this reason, it will be observed that the size of the well 11 and the length of the cross bar 12 of each anchoring element F are such that two hooks may be accommodated thereby, so that two pairs of attaching elements G may be engaged with one pair of anchoring elements F, one pair of attaching elements extending from the pair of anchoring elements to the front axle of one automobile and another pair of attaching elements extending from the same pair of anchoring elements to the rear axle of an adjacent automobile, as clearly disclosed in Figure 2. It will, of course, be appreciated that the spacing of the pairs with reference to each other may be so devised as to take care of the difference in the length of wheel bases of different makes and types of automobiles.

It will also be noted that due to the pivotal connection of the hook 30 with the shank 20, the body or remaining portion of the attaching devices may, when released, be dropped to the broken line position illustrated in Figure 1, to lie flat on the deck and thus permit the rolling away of the automobile without interference by the attaching devices G and without the immediate necessity of disengaging the hooks from the cross bars 12 of the anchoring devices F. It should also be appreciated that due to the construction and arrangement of the anchoring and attaching elements, if the tire of an automobile should become deflated, while some slack in the attaching element would of course result, such slack would not be sufficient to permit of complete release of the attaching element and the slack could be taken up either by again inflating the tire or by tightening up on the turnbuckle when detected by the crew during their frequent inspections of the cargo.

In the particular use of the invention disclosed, namely, for fastening automobiles to the deck, it will be observed that the attaching elements G at the front and rear extend at opposite angles and function in effect as trusses and exert an opposing resistance to any tendency to dislodge the cargo from the secured position. It is thought that it will be obvious that the fastening devices afford a means for expediting and facilitating the securing and releasing of the cargo and when the fastening devices are not in use, the attaching elements may be stowed away, leaving the decks clear for free cargo.

From the foregoing, it will thus be seen that the invention provides a simple and inexpensive form of accessory which has been carefully designed to perform the intended function, and while a preferred embodiment of the invention has been disclosed, variations thereof which fall within the scope of the appended claims are also intended to be covered by the invention.

What is claimed is:

1. A device for fastening cargo to the deck of a ship including a substantially cup shaped member secured in an opening in the deck and flush with the upper surface thereof, said member defining a well having a cross bar spaced from the bottom and ends of the well and a second member including a hook at one end adapted for anchorage to the cross bar of the first member and so constructed and proportioned with reference to the cross bar and well as to require swinging of the shank of the hook with the cross bar as a fulcrum to effect the engagement and disengagement of the hook from the cross bar, said second member further including a body to which the hook is pivotally attached to permit of swinging of said member with reference to the hook when engaged with the cross bar.

2. An anchoring device comprising an anchoring element adapted to be secured to a structure on which the object to be anchored rests, and an attaching element having means on one end for engagement with said anchoring element and for disengagement from the latter by disposing said attaching element in a definite position, said means enabling the attaching element to be swung to a second position in which said means will be retained in engagement with said anchoring element, and means on the remaining end of said attaching element for engagement with said object, when said first means is engaged with said anchoring element.

MICHAEL J. HANLON.